Sept. 16, 1941.   J. LIPANI   2,256,030
COMBINATION VERNIER CALIPER, DEPTH GAUGE, AND HEIGHT GAUGE
Filed Jan. 13, 1941   2 Sheets-Sheet 1
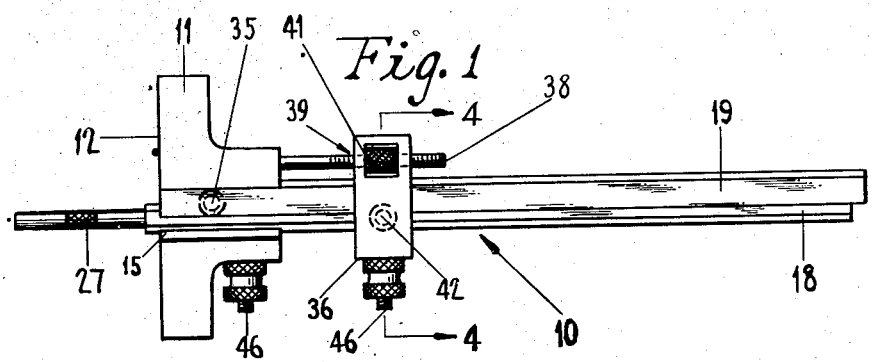
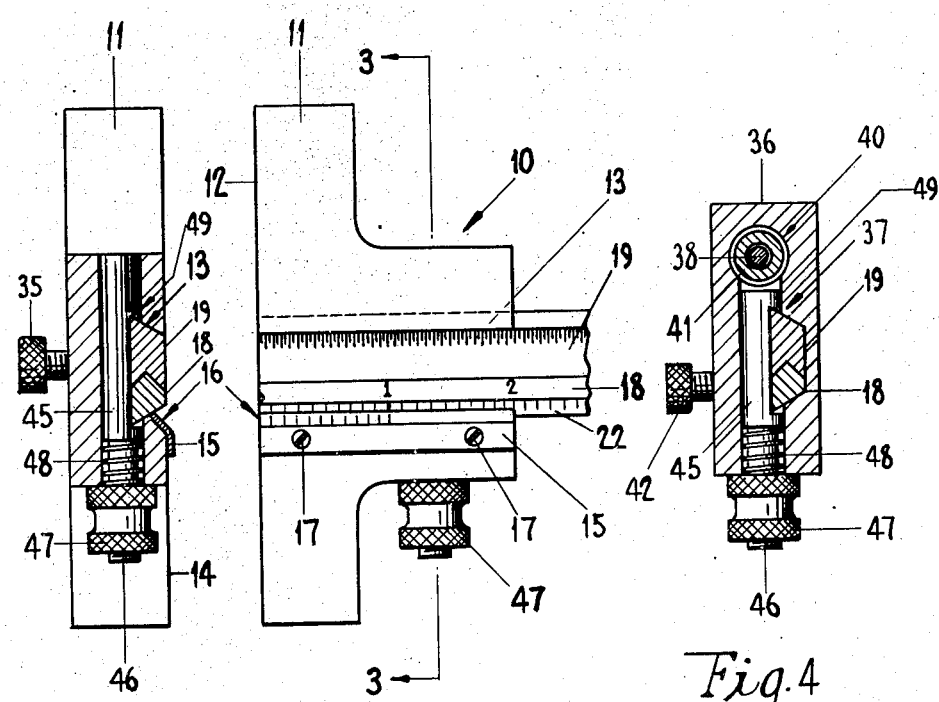
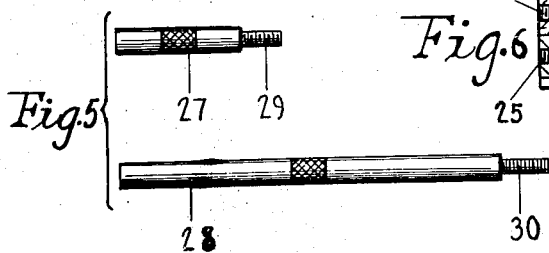
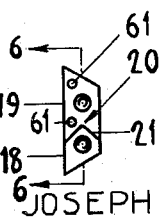
JOSEPH LIPANI
INVENTOR.
BY Joseph Blacker
ATTORNEY.

Sept. 16, 1941.  J. LIPANI  2,256,030
COMBINATION VERNIER CALIPER, DEPTH GAUGE, AND HEIGHT GAUGE
Filed Jan. 13, 1941  2 Sheets-Sheet 2
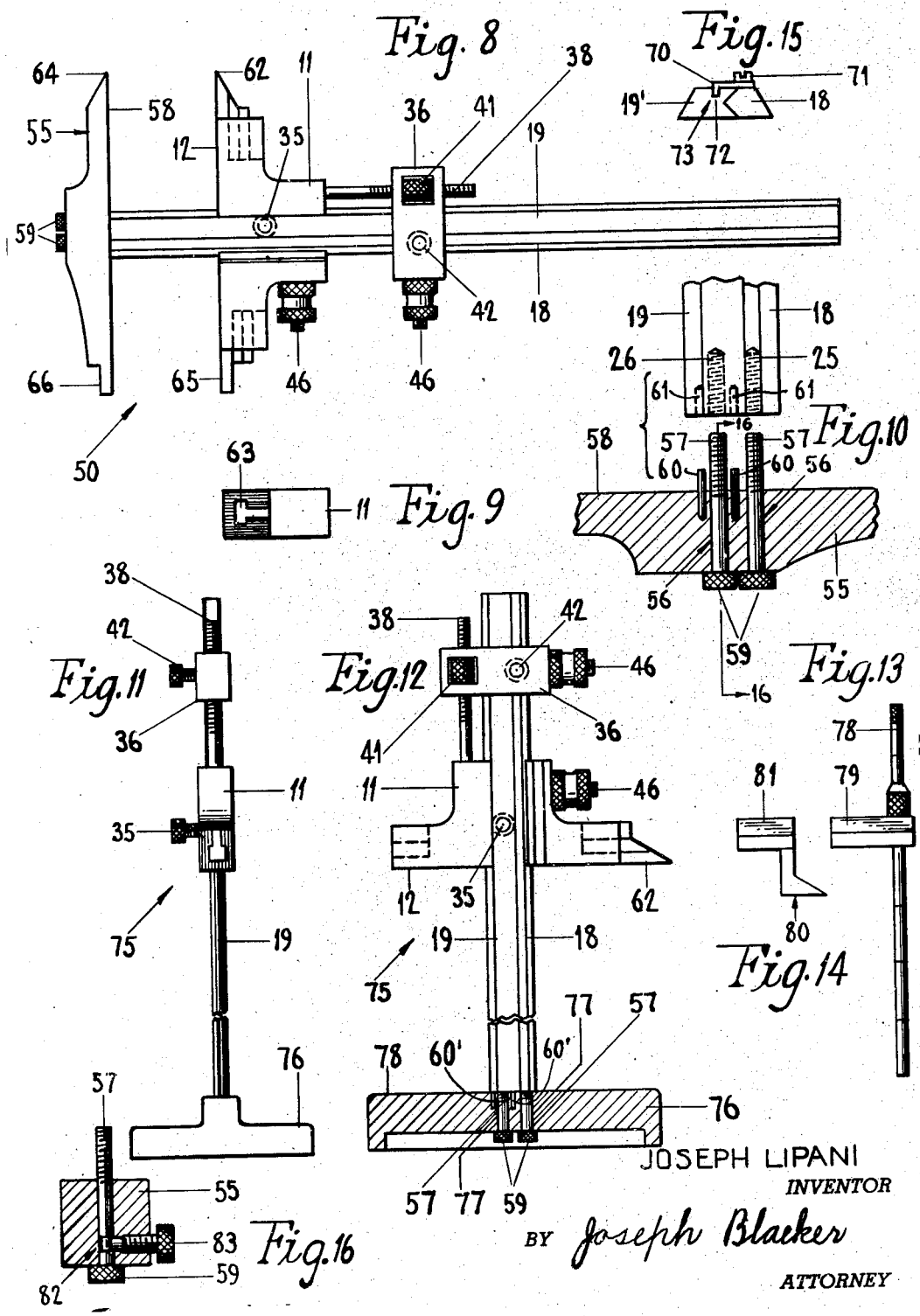
JOSEPH LIPANI
INVENTOR
BY Joseph Blacker
ATTORNEY Patented Sept. 16, 1941

2,256,030

UNITED STATES PATENT OFFICE 2,256,030

COMBINATION VERNIER CALIPER, DEPTH GAUGE, AND HEIGHT GAUGE

Joseph Lipani, Brooklyn, N. Y.

Application January 13, 1941, Serial No. 374,198

5 Claims. (Cl. 33—170)

This invention relates to distance measuring gauges and has for the primary object the provision of a combined device of this character which will permit accurate measuring of depth, thickness and height, and employs in its construction a pair of graduated measuring elements adjustable endwise to each other and both slidable in a head.

An object of this invention is to provide a combined measuring device comprising two scales having a combined trapezoidal cross-section and a head having a dove-tailed channel, and the scales being relatively slidable in the channel.

Another object of this invention is to form the two scales with outer bevelled side edges and to place the vernier scale on an angle to one of the said bevelled outer edges so as to facilitate the reading of the distances measured by the device.

Another object of this invention is to thread both scales at one end thereof and to provide means engageable with the threaded end portions so as to adapt the device for measuring distance from the said head or body.

Another object of this invention is to provide dowel pins fixed in the terminal jaw of the vernier caliper, and in the base of the vernier height gauge to insure the perfect right-angular registry and alignment of the gauge members.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view illustrating a vernier depth gauge constructed in accordance with my invention.

Figure 2 is a fragmentary top plan view of the gauge shown in Figure 1, on an enlarged scale.

Figure 3 is a cross-sectional view, the section being taken as on line 3—3 in Figure 2.

Figure 4 is a cross-sectional view, the section being taken as on line 4—4 in Figure 1.

Figure 5 is a plan view of extension rods employed with the vernier depth gauge.

Figure 6 is a fragmentary cross-sectional view of the scales, the section being taken as on line 6—6 in Figure 7.

Figure 7 is an end view of the scales.

Figure 8 is a top plan view of my combined measuring device converted for inside and outside vernier measurements.

Figure 9 is an end view of the body in which the scales are slidably mounted.

Figure 10 is a fragmentary cross-sectional view of a terminal jaw, showing dowel pins for aligning the scales and the terminal jaw.

Figure 11 is an end elevation of my combined measuring device converted for vernier height measurements.

Figure 12 is a front elevation of the height measuring tool shown in Figure 11.

Figure 13 is a depth gauge attachment used with the vernier height measuring tool shown in Figures 11 and 12.

Figure 14 is an offset marker or scriber used with the vernier height gauge.

Figure 15 is an end view of the two scales, showing a clamping device for holding the two scales in adjoining relation.

Figure 16 is a cross-sectional view, the section being taken as on line 16—16 in Figure 10 and showing means for maintaining the terminal jaw and screw in unitary relation.

In the illustrated embodiment of the invention shown in Figures 1 to 7 inclusive, the numeral 10 indicates a vernier depth gauge, comprising a body or head 11 of substantially T-shape and having its outer face 12 perfectly flat.

The head 11 has a dovetail shaped groove or channel 13 extending through the metal and being in right angular relation with the outer face 12. The channel 13 is open at the top or reading face 14 of the head 11.

One side wall of the channel 13 has been partly cut away to provide a seat for an angularly shaped member 15 having graduations forming a vernier scale 16. The member 15 has been secured to the head 11 by screws 17.

Slidably mounted in the channel 13 are two scales 18 and 19 having a combined trapezoidal cross-section and which are in relatively slidable relation.

The scale 18 has been made narrower than the scale 19. The contacting surfaces between the scales comprises a V-shaped longitudinal groove 20 in the scale 19 and a V-shaped longitudinal edge 21 in the scale 18.

The narrow scale 18 has graduations 22 coacting with the vernier scale 16 for minute measurements. The wide scale 19 has graduations of $\frac{1}{32}$ of an inch for comparatively large measurements and without the vernier.

As best shown in Figure 6, the narrow scale 18 has a threaded aperture 25 at one end, and the wide scale 19 has a threaded aperture 26 at the same end as the scale 18. The apertures 25 and 26 are of the same diameter and depth.

Extension rods 27 and 28 of known lengths and having threaded ends 29 and 30, corresponding to the threads 25 and 26 are adapted to be threaded into engagement with the scales 18, 19.

The scales 18 and 19 are movably mounted in the head 11. I have provided a screw 35 threaded into the body 11 and adapted to secure the scale 19 to said body and so that one end of the scale 19 is in alinement with the outer face 12. The scale 18 and the attached extension 27 remain in slidable relation in the body 11.

A supplementary slide 36 having a channel 37 of trapezoidal form has been slidably mounted on the scales 18 and 19. A fine screw 38, parallel with the outer edge of the scale 19, extends rigidly from the body 11 through an unthreaded clearance aperture 39 in the slide 36.

As best shown in Figure 4, the supplementary slide 36 has an opening 40 to receive a knurled adjusting nut 41 in engagement with the threads of the screw 38 and exactly fitting, flatwise, between the walls defining the opening 40.

I have provided a screw 42 threaded into the supplementary slide 36 and adapted to secure the scale 18 to said slide.

With the screw 35 securing the scale 19 to the body 11, and with the screw 42 securing the scale 18 to the supplementary slide 36, the operator may rotate the threaded nut 41 and adjust the position of the slide 36 and the scale 18.

By unscrewing the screw 35, the wider scale 19 having graduations of $\frac{1}{32}$ of an inch, may be quickly moved in the body 11 for scaled depth measurements without the vernier. One of the extensions 27 or 28 may be placed in threaded engagement in the scale 19 when measuring roughly the depth of small holes without the vernier.

The body 11 and the slide 36 have grooved clamping members 45 which have limited sliding movements and include screw threaded shanks 46 on which nuts 47 are threaded. The nuts 47 bear respectively on the body 11 and on the slide 36. Coil springs 48 are interposed between the nuts and the members 45. The members 45 have terminal hooks 49 in engagement with the outer edge of scale 19.

The members 45 may be adjusted so that the scales 18 and 19 are relatively slidable and adjustable endwise of each other with ease by manipulating the adjusting nut 41.

In the position shown in Figure 1, the extension 27 is assumed to be one inch long. The narrow scale 18 is shown as having been adjusted outwardly from the face 12, one-eighth of an inch. The vernier depth gauge 10 is thus set for measuring a distance of one and one-eighth of an inch from the face 12.

Figures 8 to 10 inclusive show my combined measuring device converted for inside and outside vernier measurements. For this purpose, I have provided a terminal jaw 55 having clearance holes 56 serving to receive screws 57 in right angular relation with the perfectly flat inner face 58 of the terminal jaw 55. The screws 57 have knurled heads 59 for manually threading the screws so as to bring the scales 18 and 19 into perfect right angular relation with the terminal jaw 55, and forming a vernier caliper 50.

I have provided dowel pins 60 extending from the terminal jaw 55 and adapted to enter the holes 61 in the ends of the scales 18 and 19 to insure the perfect right angular adjustment of the scales and the terminal jaw.

It is well known that for work requiring extreme accuracy, the knife-edge straight edge is commonly used. The testing edge is very narrow so that a line contact is obtained instead of a flat contact, as with straight edges having flat edges. This line contact shows any minute curvatures which may exist, and the accuracy of the test will not be affected if the straight edge is not held exactly at right angles with the surface being tested. The scales 18 and 19 having bevelled outer edges thus provide two knife-edge straight edges which can be utilized effectively when the terminal jaw 55 is removed.

For the purpose of measuring the root diameter of a thread, I have provided an angular extension jaw 62 adapted to enter into a T-shaped socket 63 in the head 11. The jaw 62 coacts with the angular end 64 of the terminal jaw 55 for the said thread measurements.

For the purpose of measuring inside diameters for vernier readings, I have provided an extension jaw 65 having parallel jaws adapted to enter into a T-shaped socket (not shown) at the lower end of the body 11. The extension jaw 65 coacts with the square end 66 of the terminal jaw 55 to enter into a tubular object for measuring the inside diameter. The jaws 65 and 66 also serve for measuring outside diameter.

Figure 15 shows a hook-shaped clamp 70 secured to the scale 18 by a screw 71. The clamp 70 has a right-angular extension 72 slidably mounted in a modified scale 19' having a groove 73. The groove 73 is preferably co-extensive with the scale 19'. The clamp 70 coacts with the groove 73 to hold the scales 18 and 19' in frictional engagement and prevents the spreading apart of the scales during relative endwise adjustment.

Figures 11 to 14 inclusive show my combined measuring device converted into a height gauge 75. I have provided a base 76 having clearance holes 77 serving to receive the screws 57 in right angular relation with the perfectly flat upper face 78 of the base 76. Dowel pins 60', fixed in the base 76 and adapted to enter into the holes 61 in the ends of the scales 18 and 19, insure the perfect right angular adjustment of the scales and the base.

Figure 13 shows a depth gauge attachment 78 used with the height gauge 75. The attachment 78 has parallel jaws 79 adapted to enter the T-shaped socket 63. Figure 14 shows an offset scriber 80 having parallel jaws 81 to enter the socket 63.

The drawings show a scale having the zero reading at the very end. Depth gauges presently in use have a scale wherein the zero is not at the end of the scale. This type of scale can not be used for any purpose such as measuring a hole directly, because of the necessity of adding the blank distance to the reading. Placing the zero reading at the very end, increases the usages of the scale. With the arrangement shown, the user can read directly from the edge of the surface measured.

It is to be noted that while I may have shown one of the scales narrower than the other, that I may make an embodiment of the invention in which both scales will be of the same width.

As shown in modified form in Figure 16, the screw 57 in the terminal jaw 55 has an undercut groove 82 into which the reduced end of a screw 83 is designed to enter for the purpose of bringing the screw 57 in integrally functioning relation with the terminal jaw. The unitary terminal jaw 55 and screw 57 function as means engageable with the threaded aperture means in the scales for measuring distance from the body 11.

It will thus be seen that the two threaded holes 25, 26, at one end of the scales 18 and 19 serve for receiving two screws 57, 57, (Figure 10) for securing the terminal jaw 55 to the scales. Two screws 57, 57, (Figure 12) similarly serve for securing the base 76 to the scales. The cooperation of the end apertures 25, 26, and the screws 57, 57, is thus evident by reference to Figures 10 and 12 wherein the utility of such cooperation is clearly illustrated.

In accordance with the patent statutes I have described and illustrated the preferred embodiment of my invention, but it will be understood that various changes and modifications can be made therein without departing from the spirit of the invention as defined by the appended claims.

I claim:

1. In a combined vernier depth gauge, caliper and height gauge, comprising a body having a dove-tailed groove, two scales having a combined trapezoidal cross-section mounted within said groove, one of said scales being narrower than the other, each of said scales having a threaded aperture at one end, an extension rod of predetermined length having a threaded end for threadably securing in the threaded aperture of said narrow scale, said narrow scale having the zero reading at the threaded end, means for locking said wider scale to said dove-tailed body, a hollow member having means for locking to said narrow scale, said body having a threaded extension, said hollow member having threaded means in engagement with said threaded extension, whereby rotation of said threaded means will move said narrow scale for measuring distance in relation to said body, and means for aligning said scales during said measuring.

2. In a combined vernier measuring gauge, comprising a body having a dove-tailed groove, two scales having a combined trapezoidal cross-section mounted within said groove, one of said scales being narrower than the other, each of said scales having a threaded aperture at one end, an extension rod of predetermined length having a threaded end for threadably securing in the threaded aperture of said narrow scale, means for locking said wider scale to said dove-tailed body, a hollow member having means for locking to said narrow scale, said body having a threaded extension, said hollow member having rotatable threaded means in engagement with said threaded extension, whereby rotation of said threaded means will move said narrow scale for measuring distance in relation to said body, and means for aligning said scales during said measuring.

3. In a combined vernier measuring gauge comprising a body having a dove-tailed groove, scale means fittingly mounted within said groove, said scale means having threaded aperture means at one end thereof, means engageable with said threaded aperture means and being adapted for measuring distance from said body, said scale means having bevelled outer side edges, and said body having a vernier scale angularly positioned to one of said bevelled outer side edges.

4. In a combined vernier measuring gauge, comprising a body having a dove-tailed groove, two scales having a combined trapezoidal cross-section mounted within said groove, each of said scales having a threaded aperture at one end, an extension rod of predetermined length having a threaded end for threadably securing in the threaded aperture of one of said scales, means for locking the other scale to said dove-tailed body, a hollow member having means for locking to one of said scales, said body having a threaded extension, said hollow member having rotatable threaded means in engagement with said threaded extension, whereby rotation of said threaded means will move said extension rod carrying scale for measuring distance in relation to said body.

5. In a combined vernier measuring gauge comprising a body having a dove-tailed groove, two scales fittingly mounted within said groove, each of said scales having threaded aperture means at one end thereof, means engageable with said threaded aperture means and being adapted for measuring distance from said body, said body having a vernier scale, said body having an elongated threaded extension, a hollow member having means for locking to one of said scales, said hollow member having threaded means in engagement with said threaded extension, whereby rotation of said threaded means will move said distance measuring means from said body.

JOSEPH LIPANI.